United States Patent
Emori et al.

(10) Patent No.: US 6,715,573 B2
(45) Date of Patent: Apr. 6, 2004

(54) RADIATOR CORE SUPPORT STRUCTURE FOR VEHICLE

(75) Inventors: Norio Emori, Saitama (JP); Yutaka Esashi, Saitamai (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 10/005,919

(22) Filed: Dec. 7, 2001

(65) Prior Publication Data

US 2002/0084122 A1 Jul. 4, 2002

(30) Foreign Application Priority Data

Dec. 7, 2000 (JP) ........................................ 2000-372897
Dec. 7, 2000 (JP) ........................................ 2000-373015

(51) Int. Cl.[7] .............................................. B60R 11/04
(52) U.S. Cl. ................................. 180/68.4; 296/203.02
(58) Field of Search .............................. 180/68.4, 68.6; 296/203.02, 194

(56) References Cited

U.S. PATENT DOCUMENTS

| | | | | |
|---|---|---|---|---|
| 5,123,695 A | * | 6/1992 | Kanemitsu et al. | 280/68.4 |
| 5,190,803 A | | 3/1993 | Goldbach et al. | |
| 5,271,473 A | * | 12/1993 | Ikeda et al. | 280/68.4 |
| 5,409,288 A | * | 4/1995 | Masuda | 280/68.4 |
| 5,575,526 A | * | 11/1996 | Wycech | 280/68.4 |
| 5,658,041 A | * | 8/1997 | Girardot et al. | 280/68.4 |
| 5,884,960 A | * | 3/1999 | Wycech | 280/68.4 |
| 6,168,226 B1 | * | 1/2001 | Wycech | 280/68.4 |
| 6,189,958 B1 | * | 2/2001 | Guyomard et al. | 280/68.4 |

(List continued on next page.)

FOREIGN PATENT DOCUMENTS

| | | |
|---|---|---|
| EP | 0 370 342 | 5/1990 |
| EP | 1 084 940 | 3/2001 |
| FR | 2 783 796 | 3/2000 |
| JP | 2931605 | 5/1999 |
| JP | 2001-1941 | 1/2001 |
| WO | 01/00478 | 1/2001 |

OTHER PUBLICATIONS

U.S. patent application Ser. No. 09/995,805, Joutaki et al., filed Nov. 29, 2001.
U.S. patent application Ser. No. 09/995,811, Haneda et al., filed Nov. 29, 2001.

*Primary Examiner*—Brian L. Johnson
*Assistant Examiner*—Jeffrey J. Restifo
(74) *Attorney, Agent, or Firm*—Foley & Lardner

(57) ABSTRACT

A radiator core support structure for a vehicle including a radiator core support upper section extending generally along a direction of width of the vehicle. A radiator core support lower section is provided extending generally along the direction of width of the vehicle and located below the radiator core support upper section. Here, the radiator core support upper section and/or lower section are formed of metal and has an open loop-shaped cross-section which is opened rearward to form a channel. A hood lock stay is provided extending generally vertical, to connect the generally central parts of the radiator core support upper and lower sections. The hood lock stay is formed of synthetic resin and molded in a metallic mold in which the radiator core support upper section and/or lower section are located. A plurality of reinforcement ribs are formed of the synthetic resin and fixedly disposed inside the channel of the radiator core support upper section and/or lower section. The reinforcement ribs continuously extend in a longitudinal direction of the radiator core support upper section and/or lower section. Each reinforcement rib extends to fixedly connect an upper wall and a lower wall of the radiator core support upper section and/or lower section. Additionally, a struck portion is integrally formed at a part of each reinforcement rib and to be struck by an ejector pin for extracting the radiator core support structure from the metallic mold.

23 Claims, 15 Drawing Sheets

U.S. PATENT DOCUMENTS

| | | | |
|---|---|---|---|
| 6,196,624 B1 * | 3/2001 | Bierjon et al. | 280/68.4 |
| 6,216,810 B1 * | 4/2001 | Nakai et al. | 280/68.4 |
| 6,273,496 B1 * | 8/2001 | Guyomard et al. | 280/68.4 |
| 6,357,821 B1 * | 3/2002 | Maj et al. | 280/68.4 |
| 6,406,078 B1 * | 6/2002 | Wycech | 280/68.4 |
| 6,412,855 B1 * | 7/2002 | Cantineau et al. | 280/68.4 |
| 6,502,653 B1 * | 1/2003 | Balzer et al. | 280/68.4 |
| 6,516,906 B2 * | 2/2003 | Sasano et al. | 280/68.4 |
| 6,547,317 B1 * | 4/2003 | Cheron et al. | 280/68.4 |
| 6,578,650 B2 * | 6/2003 | Ozawa et al. | 280/68.4 |
| 6,622,808 B2 * | 9/2003 | Sasano et al. | 180/68.3 |

* cited by examiner

RADIATOR CORE SUPPORT STRUCTURE FOR VEHICLE

BACKGROUND OF THE INVENTION

This invention relates to improvements in a radiator core support structure for an automotive vehicle which structure supports a radiator core and installed to a front structure of a vehicle body.

Hitherto a radiator core support structure for an automotive vehicle has taken such a basic configuration that radiator core support upper and lower sections are provided to extend generally along the direction of width of the vehicle, and the laterally central parts of the radiator core support upper and lower sections are connected by a hood lock stay which generally vertically extends. In the radiator core support structure of this kind, all the basic component parts are formed of metal, and therefore a torsional deformation and a dimensional error tend to readily occur in an assembly process in which the basic component parts are assembled under welding so that an installation operation of the radiator core support structure to a vehicle body becomes difficult after the assembly process.

In order to prevent the torsional deformation and the assembly-dimensional error from occurrence, it may be proposed that at least the hood lock stay of the radiator core support structure is formed of synthetic resin thereby providing a so-called hybrid structure which is free from causes for producing the torsional deformation and the assembly dimensional error. In this case, it is necessary for securely uniting parts formed of metal and parts formed of synthetic resin, that the radiator core support upper section and/or the like are formed to have a so-called open loop-shaped cross-section to form a channel, and a resin-reinforcement section (such as resin-reinforcement ribs) as disclosed in Japanese Patent No. 2931605 is integrally formed inside and along the channel of the radiator core support upper section and/or the like.

However, assume that a proposal is presented to form at least the hood lock stay of synthetic resin while disposing the resin-reinforcement section or resin-reinforcement ribs inside the channel of the radiator core support upper section and/or the like formed of metal. In this case, the reinforcement section is formed only at one side (inside of the channel) of the radiator core support upper section and/or the like, and therefore there is a fear that the united condition between the reinforcement section and the radiator core support upper section and/or the like will be broken when a large load is applied to the reinforcement section in a direction in which the reinforcement section separates from the radiator core support upper section and/or the like. Additionally, in case that a plurality of the reinforcement ribs are formed in and extending along the channel of the radiator core support upper section and/or the like, there is a fear that a part of the reinforcement ribs will be broken when a final product of the radiator core support structure is taken out from a metallic mold, so that the broken reinforcement ribs will be left within the metallic mold. This deteriorates the yield of the product and makes maintenance (for example, removing the left reinforcement ribs) of the metallic mold troublesome.

BRIEF SUMMARY OF THE INVENTION

In view of the above, it is an object of the present invention is to provide an improved radiator core support structure which can effectively overcome drawbacks encountered in conventional radiator core support structures.

Another object of the present invention is to provide an improved radiator core support structure whose whole body and essential parts are high in structural rigidity as compared with the conventional radiator core support structures.

A further object of the present invention is to provide an improved radiator core support structure whose reinforcement section formed of synthetic resin can be effectively prevented from being peeled off from a radiator core support upper section and/or the like.

A still further object of the present invention is to provide an improved radiator core support structure having a radiator core support upper section and/or the like which is formed with a channel whose inside is filled with a plurality of reinforcement ribs formed of synthetic resin, in which the reinforcement ribs can be effectively prevented from being broken during extraction of the reinforcement ribs form a metallic mold.

An aspect of the present invention resides in a radiator core support structure for a vehicle, comprising a radiator core support upper section extending generally along a direction of width of the vehicle. A radiator core support lower section is provided extending generally along the direction of width of the vehicle and located below the radiator core support upper section. Here, at least one of the radiator core support upper section and the radiator core support lower section is formed of metal and has an open loop-shaped cross-section which is opened rearward to form a channel extending in a longitudinal direction of the at least one of the radiator core support upper section and the radiator core support lower section. The at least one of the radiator core support upper section and the radiator core support lower section has an upper wall and a lower wall. A hood lock stay is provided extending generally vertical, to connect a generally central part of the radiator core support upper section and a generally central part of the radiator core support lower section, the generally central part being in the direction of width of the vehicle. The hood lock stay is formed of synthetic resin and molded in a metallic mold in which the at least one of the radiator core support upper section and the radiator core support lower section is located. Additionally, a reinforcement section is formed of synthetic resin and fixedly disposed inside the channel of the at least one of the radiator core support upper section and the radiator core support lower section. The reinforcement section continuously extends in a longitudinal direction of the at least one of the radiator core support upper section and the radiator core support lower section.

Another aspect of the present invention resides in a radiator core support structure for a vehicle, comprising a radiator core support upper section extending generally along a direction of width of the vehicle. A radiator core support lower section is provided extending generally along the direction of width of the vehicle and located below the radiator core support upper section. Here, at least one of the radiator core support upper section and the radiator core support lower section is formed of metal and has an open loop-shaped cross-section which is opened rearward to form a channel extending in a longitudinal direction of the at least one of the radiator core support upper section and the radiator core support lower section. The at least one of the radiator core support upper section and the radiator core support lower section has an upper wall and a lower wall. A hood lock stay is provided extending generally vertical, to connect a generally central part of the radiator core support upper section and a generally central part of the radiator core support lower section, the generally central part being in the direction of width of the vehicle. The hood lock stay is formed of synthetic resin and molded in a metallic mold in which the at least one of the radiator core support upper section and the radiator core support lower section is located. A plurality of reinforcement ribs are formed of the synthetic resin and fixedly disposed inside the channel of the at least one of the radiator core support upper section and the radiator core support lower section. The reinforcement ribs continuously extends in a longitudinal direction of the at least one of the radiator core support upper section and the radiator core support lower section. Each reinforcement rib extends to fixedly connect the upper wall and the lower wall of the at least one of the radiator core support upper section and the radiator core support lower section. Additionally, a struck portion is integrally formed at a part of each reinforcement rib and to be struck by an ejector pin for extracting the radiator core support structure from the metallic mold.

A further aspect of the present invention resides in a radiator core support structure for a vehicle, comprising a radiator core support upper section extending generally along a direction of width of the vehicle. A radiator core support lower section is provided extending generally along the direction of width of the vehicle and located below the radiator core support upper section, wherein at least one of the radiator core support upper section and the radiator core support lower section is formed of metal and has an open loop-shaped cross-section which is opened rearward to form a channel extending in a longitudinal direction of the at least one of the radiator core support upper section and the radiator core support lower section. The at least one of the radiator core support upper section and the radiator core support lower section has an upper wall and a lower wall. A hood lock stay is provided extending generally vertical, to connect a generally central part of the radiator core support upper section and a generally central part of the radiator core support lower section, the generally central part being in the direction of width of the vehicle. The hood lock stay is formed of synthetic resin and molded in a metallic mold in which the at least one of the radiator core support upper section and the radiator core support lower section is located. A reinforcement section is formed of synthetic resin and fixedly disposed inside the channel of the at least one of the radiator core support upper section and the radiator core support lower section. The reinforcement section continuously extends in a longitudinal direction of the at least one of the radiator core support upper section and the radiator core support lower section. Additionally, a covering section is formed of the synthetic resin and contiguous with the reinforcement section. The covering section covers an outer surface of the at least one of the radiator core support upper section and the radiator core support lower section and extends from an outer surface of an upper wall to the outer surface of the lower wall of the at least one of the radiator core support upper section and the radiator core support lower section. The covering section is formed with at least one opening located corresponding to at least one of the upper wall and the lower wall. A surface of the at least one of the upper wall and the lower wall is exposed through the at least one opening.

A still further aspect of the present invention resides in a metallic mold used for injection molding of a radiator core support structure for a vehicle. The radiator core support structure includes a radiator core support upper section extending generally along a direction of width of the vehicle; a radiator core support lower section extending generally along the direction of width of the vehicle and located below the radiator core support upper section, wherein at least one of the radiator core support upper section and the radiator core support lower section is formed of metal and has an open loop-shaped cross-section which is opened rearward to form a channel extending in a longitudinal direction of the at least one of the radiator core support upper section and the radiator core support lower section, the at least one of the radiator core support upper section and the radiator core support lower section having an upper wall and a lower wall; a hood lock stay extending generally vertical, for connecting a generally central part of the radiator core support upper section and a generally central part of the radiator core support lower section, the generally central part being in the direction of width of the vehicle, the hood lock stay being formed of synthetic resin and molded in a metallic mold in which the at least one of the radiator core support upper section and the radiator core support lower section is located; a reinforcement section formed of synthetic resin and fixedly disposed inside the channel of the at least one of the radiator core support upper section and the radiator core support lower section, the reinforcement section continuously extending in a longitudinal direction of the at least one of the radiator core support upper section and the radiator core support lower section; and a covering section formed of the synthetic resin and contiguous with the reinforcement section, the covering section covering an outer surface of the at least one of the radiator core support upper section and the radiator core support lower section and extending from an outer surface of the upper wall to an outer surface of the lower wall of the at least one of the radiator core support upper section and the radiator core support lower section, the covering section being formed with at least one opening located corresponding to at least one of the upper wall and the lower wall, a surface of the at least one of the upper wall and the lower wall being exposed through the at least one opening.

Here, the synthetic resin is injected into the metallic mold to form the hood lock stay to be united with the radiator core support upper section and the radiator core support lower section. The metallic mold comprises a stationary mold. A movable mold is provided to be movable in a first direction relative to the stationary mold. Additionally, a slide mold is provided to be slidably movable in a second direction relative to the stationary mold, the second direction having an angle relative to the first direction. The slide mold has a projection located and shaped corresponding to the at least one opening formed in the covering section.

DETAILED DESCRIPTION OF THE INVENTION

Figure 1:
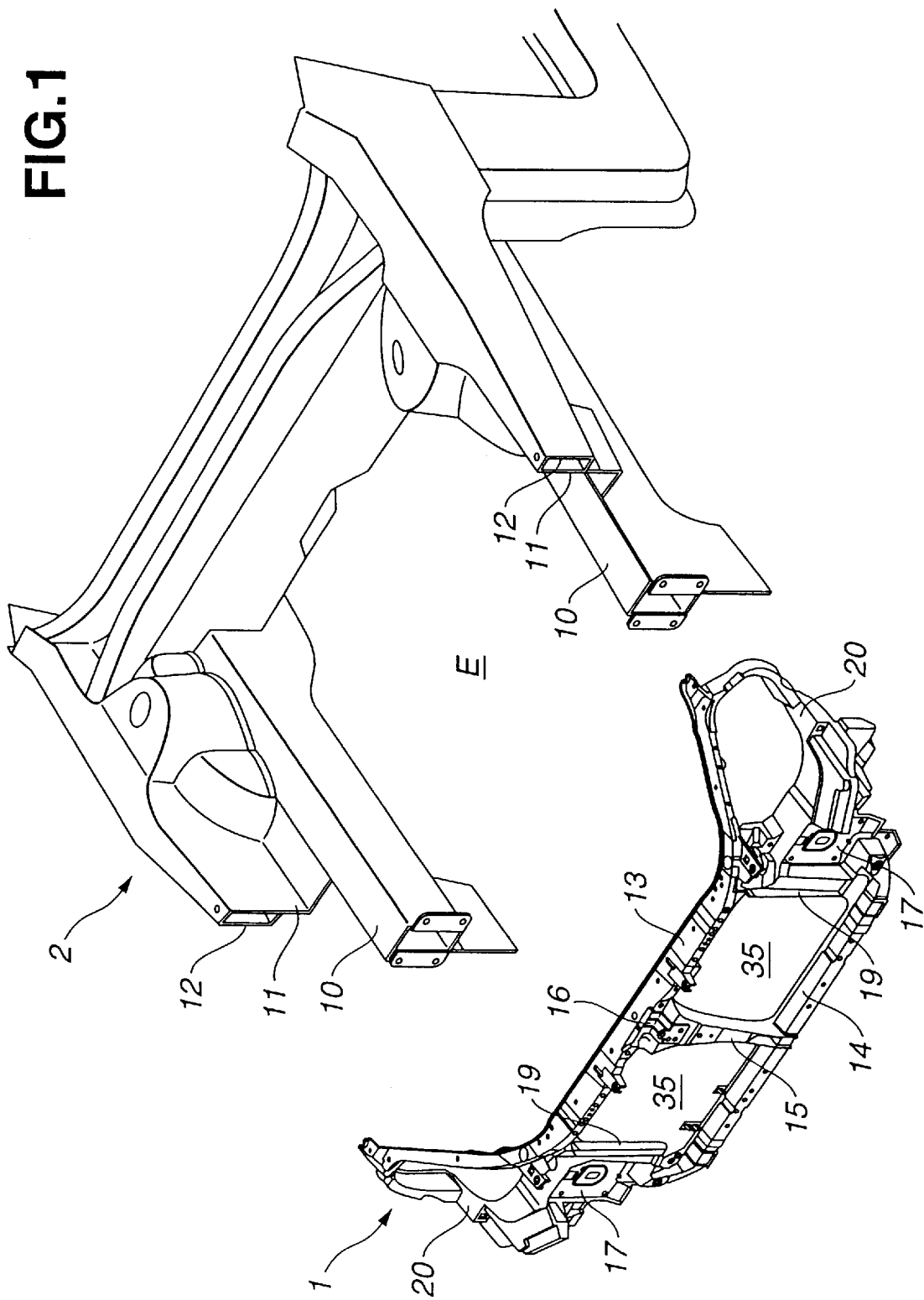
FIG. 1 is a perspective view of an embodiment of a radiator core support structure according to the present invention, together with a front structure of a vehicle body.
Figure 2:
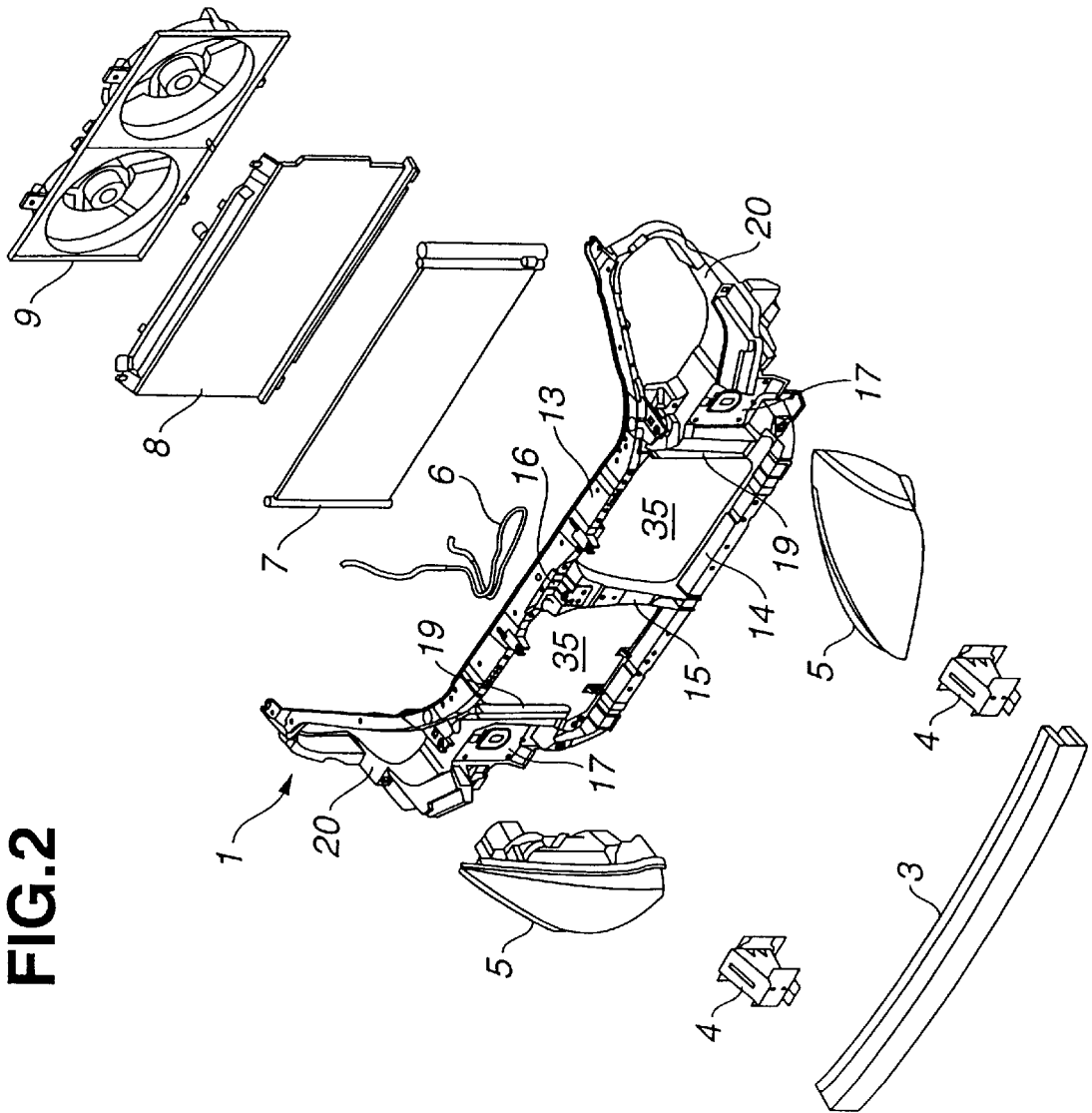
FIG. 2 is a perspective view of an exploded perspective view of the radiator core support structure of FIG. 1 together with parts modularized with the radiator core support structure.

Referring now to FIGS. 1 to 11, particularly FIGS. 1 and 2, an embodiment of a radiator core supporting structure according to the present invention is illustrated by the reference numeral 1. The radiator core supporting structure 1 is assembled with a bumper 3, bumper stays 4, head lights 5, an oil cooler tube 6 of a power steering system, a condenser 7, a radiator 8, a fan shroud 9 and the like to form a module. The radiator core supporting structure 1 is installed in the form of the module and not in the form of the single radiator core supporting structure, to a front structure 2 of a vehicle body of an automotive vehicle as shown in FIG. 2. The vehicle body front structure 2 includes a pair of front side members 10 which are located opposite sides of an engine compartment E and extends in the fore and aft directions. Each front side member 10 has a closed loop-shaped cross-section or generally O-shaped cross-section. A hood-ledge panel 11 is formed outside and above the front side member 10. A hood-ledge reinforcement 12 is joined to and located outside the hood-ledge panel 11, thereby to form a structure having a closed loop-shaped cross-section.

Figure 3:
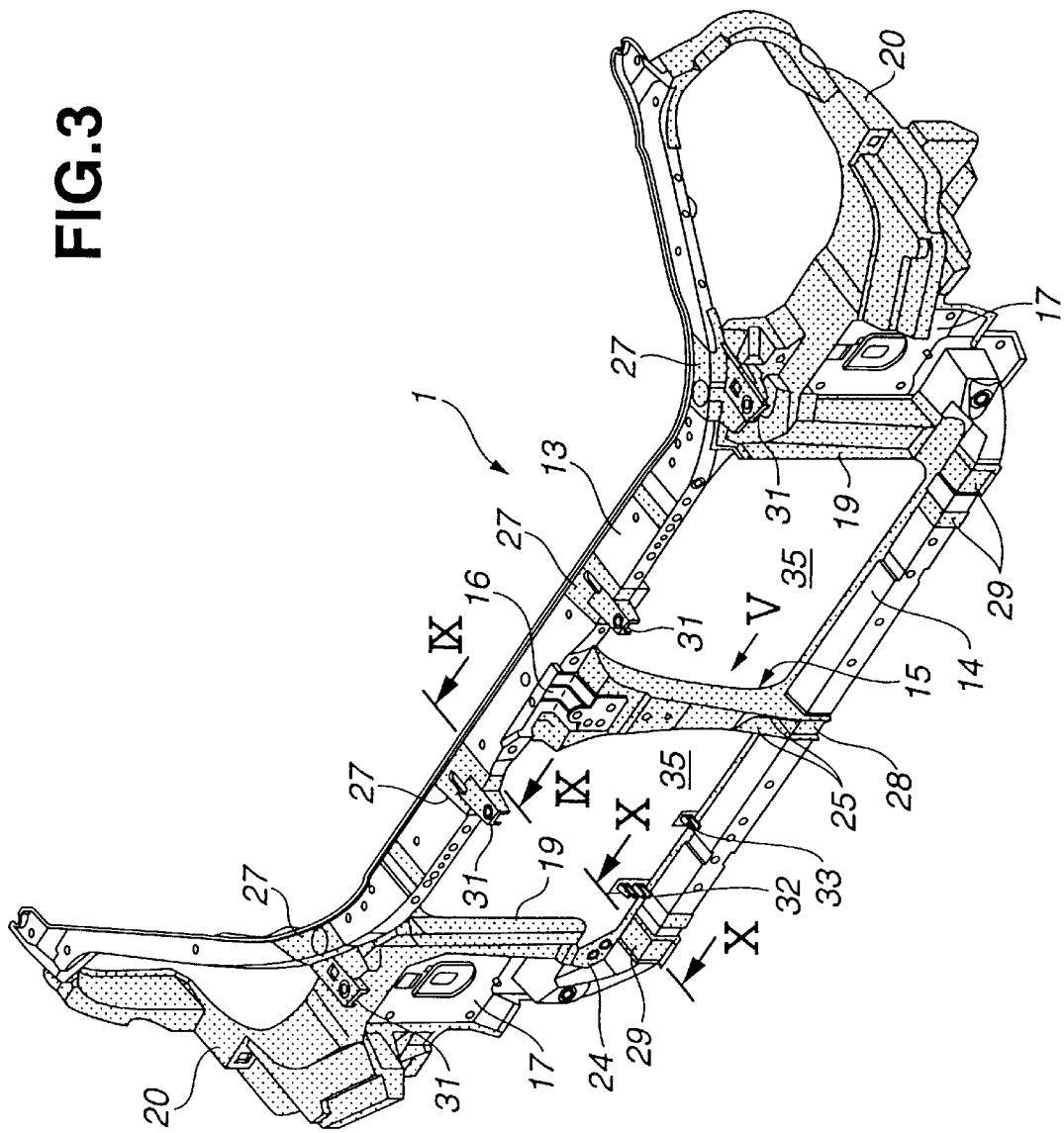
FIG. 3 is a perspective view of the radiator core support structure of FIG. 1 in which bright sections indicate parts formed of metal while dark sections indicate parts formed of synthetic resin.

The radiator core supporting structure 1 includes a radiator core support upper section 13 and a radiator core support lowers section 14 which are located respectively at the upper side and the lower side to be vertically separate from each other. Each of the radiator core support upper and lower sections 13, 14 extends laterally or in the direction of width of the vehicle. A hood lock stay 15 is provided to generally vertically extend and connect laterally central parts of the radiator core support upper and lower sections 13, 14. In other words, an upper end section of the hood lock stay 15 is fixedly connected to the central part of the radiator core support upper section 13 while a lower end section of the hood lock stay 15 is fixedly connected to the central part of the radiator core support lower section 14. The radiator core support structure 1 includes parts (indicated as bright sections) formed of metal and parts (indicated as being dark sections) formed of synthetic resin or plastic, as shown in FIG. 3.

Figure 4:
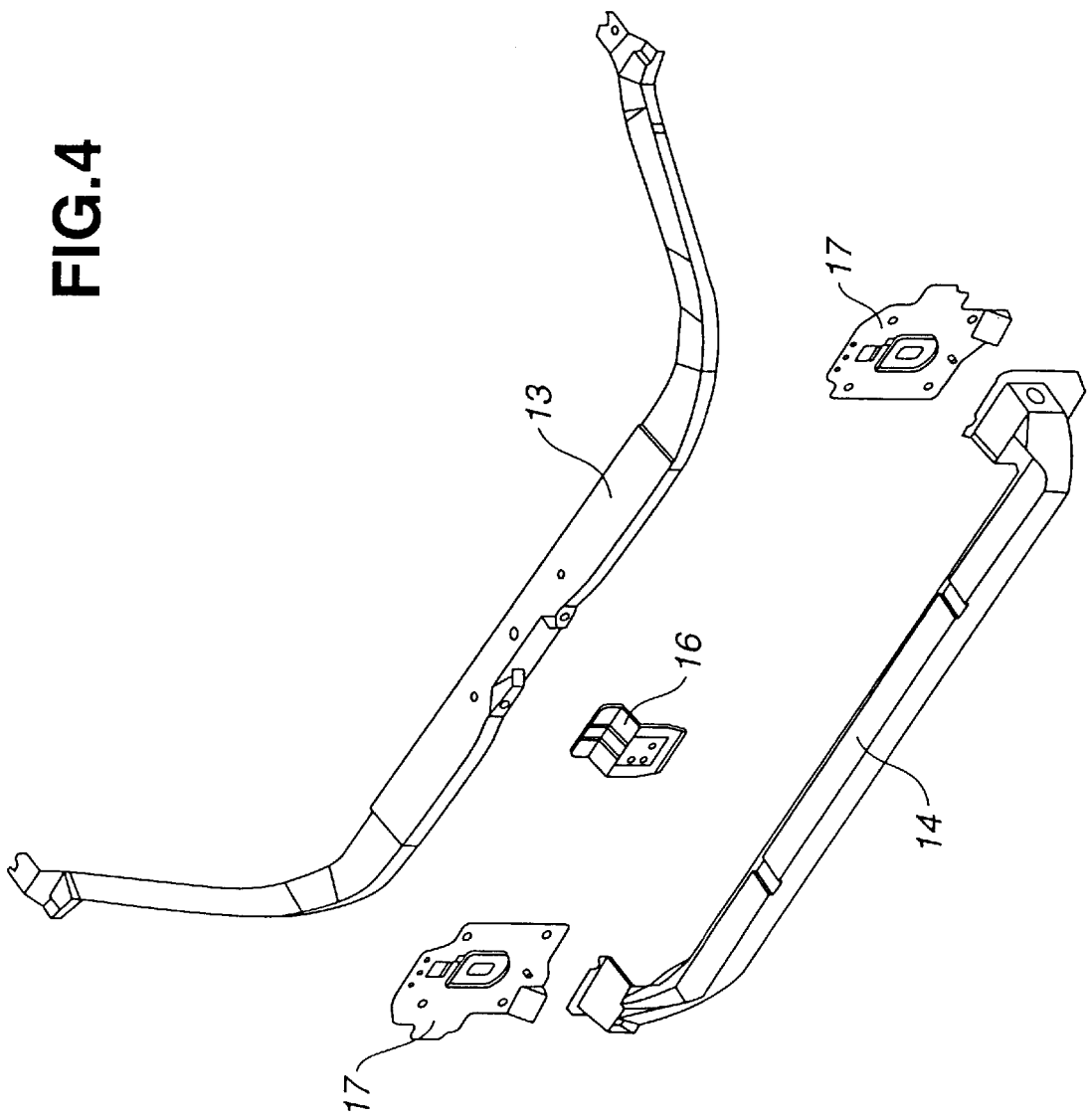
FIG. 4 is an exploded perspective view of the parts formed of metal, shown in FIG. 3.

The parts formed of metal are shown in FIG. 4. More specifically, the radiator core support upper section 13, a hood lock installation section 16 to be welded to the central part of the radiator core support upper section 13, the radiator core support lower section 14, and side sections to be welded respectively to the opposite end sections of the radiator core support lower section 14 are formed of metal. The other sections in the radiator core support structure 1 shown in FIG. 3 are formed of synthetic resin.

While the hood lock installation section 16 has been shown and described as being in a state where the section 16 formed as a separate member is installed to the radiator core upper section 13, it will be understood that the section 16 may be formed integral with the radiator core support upper section 13. Similarly, the side sections 17 may be formed integral with the radiator core support lower section 14.

Figure 5:
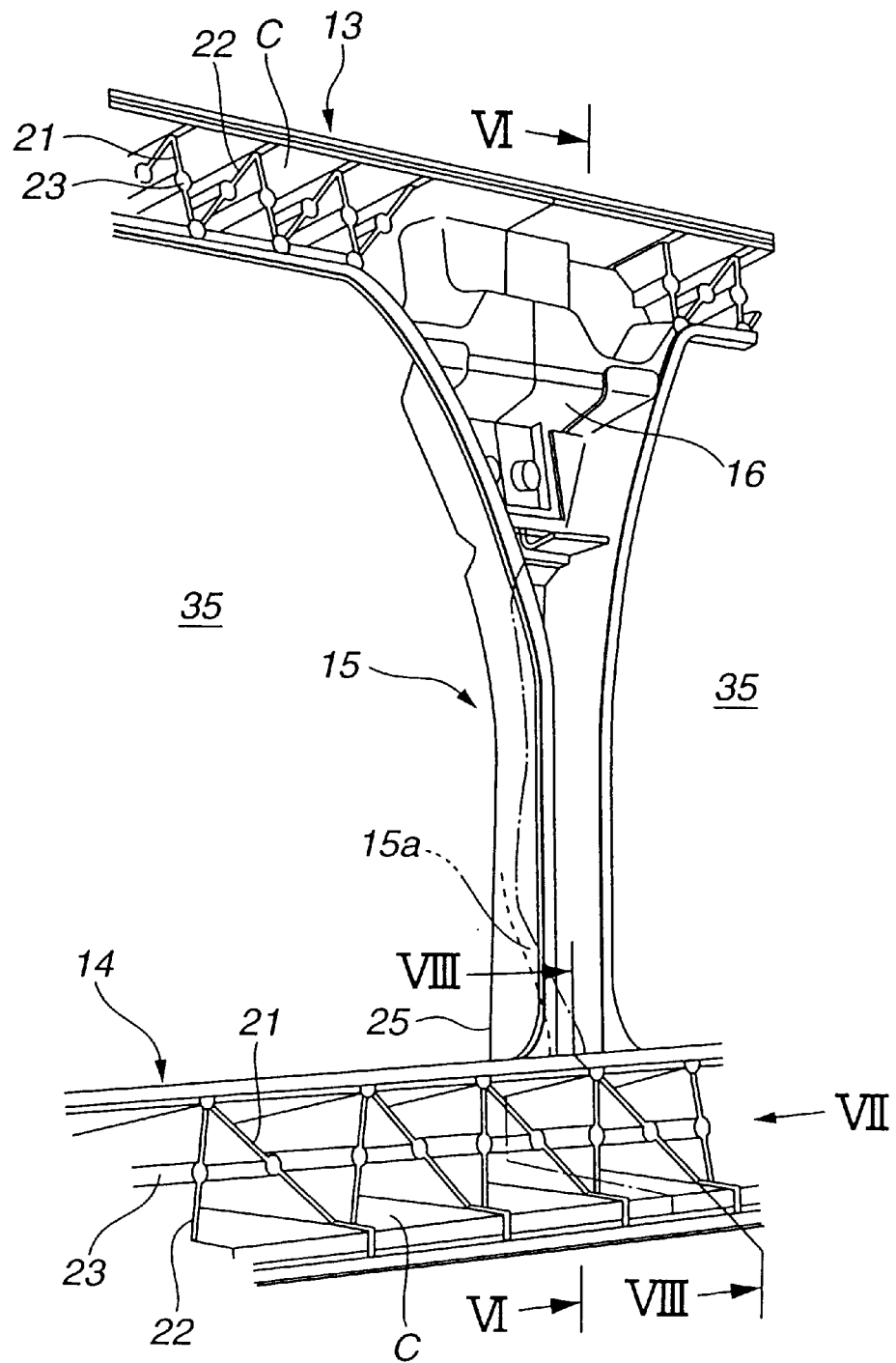
FIG. 5 is a fragmentary perspective view of a hood lock stay as viewed from the direction indicated by an arrow V.
Figure 6:
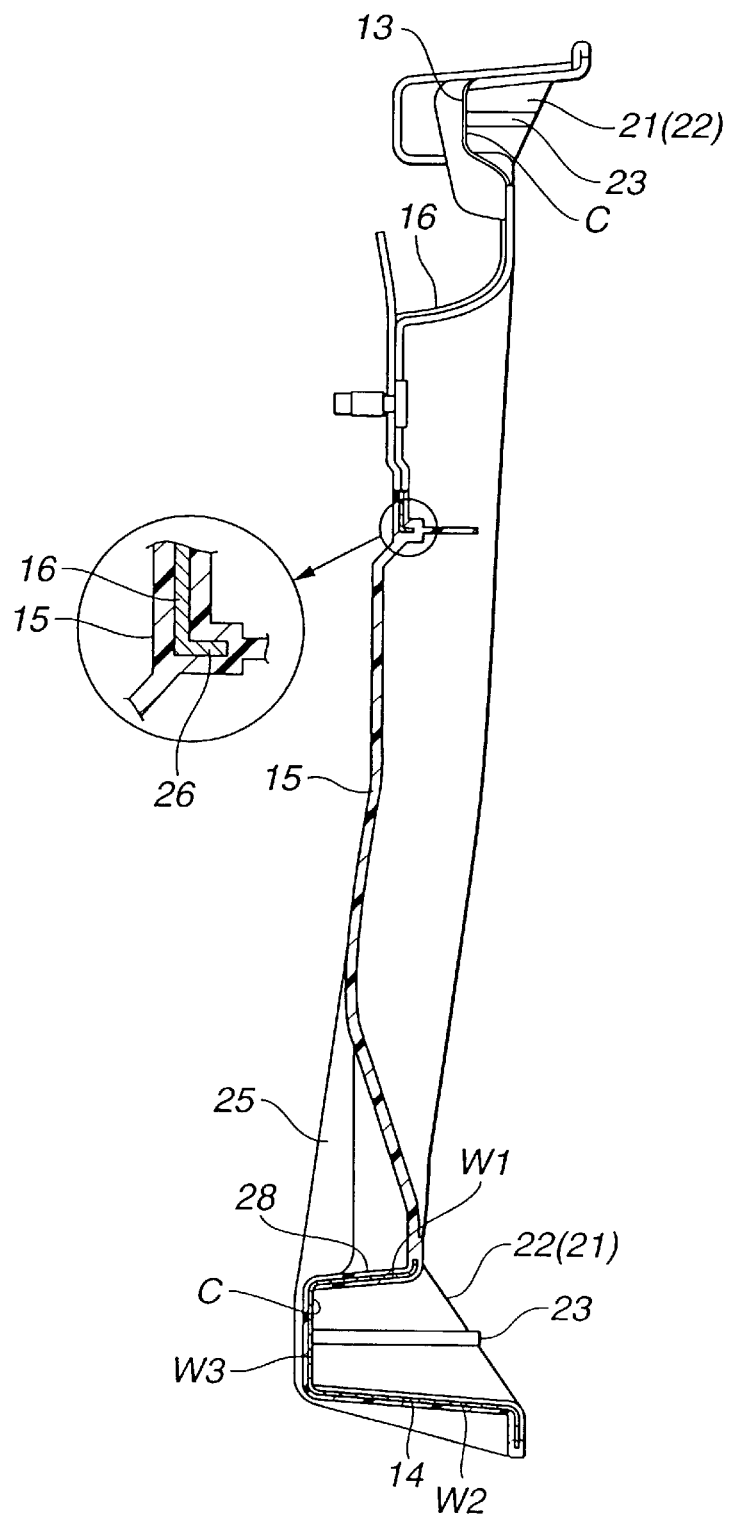
FIG. 6 is a longitudinal sectional view of the hood lock stay, taken in the direction of arrows substantially along the line VI—VI of FIG. 5.

Each of the radiator core support upper section 13 and the radiator core support lower sections 14 has a generally C-shaped cross-section or open loop-shaped cross-section as shown in FIGS. 5 and 6. The radiator core support structure 1 is produced by setting the radiator core support upper and lower sections 13, 14 in a cavity of a metallic mold 18 in their state where the food lock installation section 16 and the side sections 17 are installed to them, and then by injecting synthetic resin into the cavity, thus accomplishing an injection molding.

First, the structure of the radiator core support structure 1 itself produced under the injection molding will be discussed. Thereafter, the process of the injection molding using the metallic mold 18 will be discussed.

As shown in FIG. 3, the injected synthetic resin mainly forms the hood lock stay 15, pillar sections 19 for connecting the radiator core support upper section 13 and the radiator core support lower section 14 in a condition where the inboard side edge portion of each side section 17 is embedded in the pillar section 19, and lamp installation sections 20 each of which connects the side section 17 and one of the opposite end sections of the radiator core support upper section 13. Accordingly, two openings 35 for the radiator are formed in the thus produced radiator core support structure 1, in which one opening 35 is located between the left-side pillar section 19 and the hood lock stay 15 while the other opening 35 is located between the right-side pillar section and the hood lock stay 15.

In addition to the above sections which are appeared outside, the injected synthetic resin forms a plurality of inclined or reinforcement ribs (resin-reinforcement section) 21, 22 which are formed in the channel C of the generally channel-shaped radiator core support upper section 13 and in the channel C of the generally channel-shaped radiator core support lower section 14. The inclined ribs 21, 22 are formed extending along the length of the radiator core support lower section 14 and the radiator core support lower section 14. These inclined ribs 21, 22 extend from each of the upper and lower end sections of the hood lock stay 15 into each of the channels C of the radiator core support upper and lower sections 13, 14. Each of the inclined ribs 21, 22 is generally plate-shaped and extends from the inner surface of the upper wall W1 to the inner surface of the lower wall W2 as shown in FIGS. 6 and 8 to 10. Each of the inclined ribs 21, 22 extends generally perpendicular to the bottom wall W3 connecting the upper and lower walls W1, W2. The inclined ribs 21, 22 form a zigzag pattern rib structure which continuously extends in the direction of width of the vehicle in a zigzag pattern and reaches the opposite end sections of the radiator core support upper and lower sections 13, 14. Each of the inclined ribs 21, 22 is formed with a generally cylindrical or column-like struck portion 23 which is formed at the central part of the rib and extends generally parallel with the upper and lower walls W1, W2 as shown in FIG. 6. This struck portion 23 is used during the injection molding using the metallic mold 18 and will be discussed after.

Figure 7:
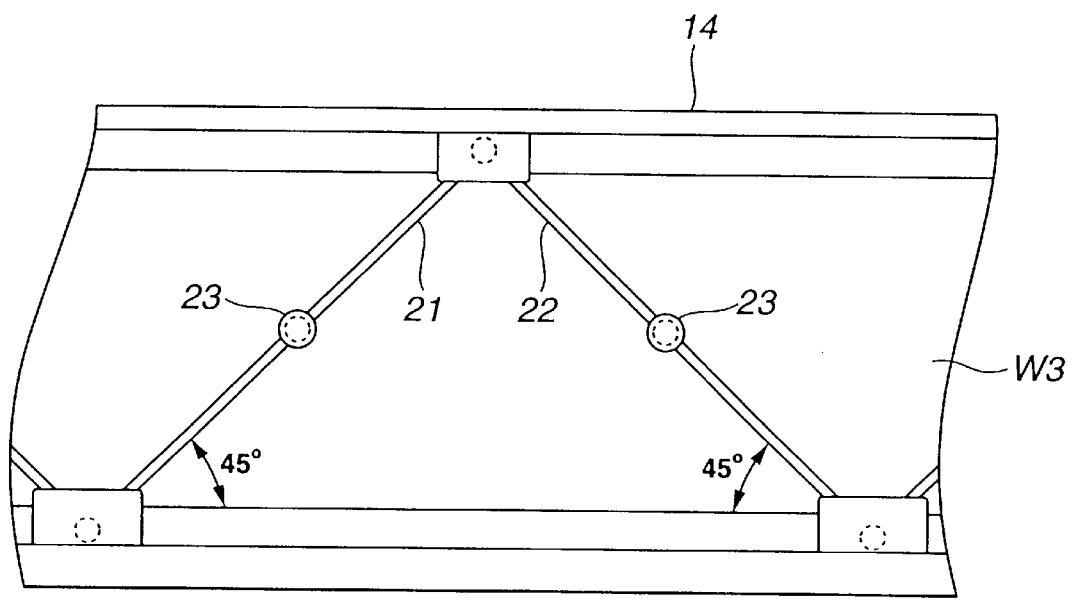
FIG. 7 is a fragmentary side view as viewed from the direction of an arrow VII of FIG. 5, showing inclined ribs of a radiator core support lower section.

Thus, the zigzag pattern rib structure including the ribs 21, 22 is spread within the channels C of the radiator core support upper and lower sections 13, 14, so that the parts formed of metal and the parts formed of synthetic resin can be rigidly and strongly united to each other, providing the radiator core support upper and lower sections 13, 14 light in weight and high in rigidity. As shown in FIG. 7, each of the inclined ribs 21, 22 inclines to form an angle of 45° relative to an imaginary horizontal plane (vertical to the bottom wall W3) extending in the longitudinal direction of the radiator core support upper and lower sections 13, 14. This angle is very effective for improving the buckling strength and torsional rigidity of the radiator core support upper and upper sections 13, 14.

The radiator core support upper section 13 located at the upper side and the radiator core support lower section 14 located at the lower side are connected to each other through the pillar sections 19, and therefore loads in vertical directions can be transmitted not only through the hood lock stay 15 and but also through the pillar sections 19. This can improve the rigidity of the radiator core support structure 1 in the vertical direction. Additionally, since each of the pillar sections 19 is rigidly connected to the inboard side edge portion of each of the side sections 17, the radiator core support structure 1 is put in a state where its upper, lower and lateral parts are connected by the pillar sections 19 thereby improving the torsional rigidity around the side sections 17. Further, each of the lamp installation sections 20 having a complicated three-dimensional shape is located to fill the space between each of the opposite end sections of the radiator core support upper section 13 and each of the side sections 17, and therefore the whole body of the radiator core support structure 1 can be improved in torsional rigidity.

As shown in FIGS. 5 and 6, the main body section of the hood lock stay 15 has a generally C-shaped cross-section or open loop-shaped cross-section which opens rearward. However, the bottom or front wall 15a of the lower end section of the hood lock stay 15 is inclined rearward and connected to the rear end section of the radiator core support lower section 14. The reason why the cross-sectional shape of the lower end section of the hood lock stay 15 is different from or changed relative to that of the upper end section is that the radiator core support lower section 14 has the generally C-shaped cross-section, and it is necessary to put the radiator core support lower section 14 between a stationary mold 36 and a movable mold 37 of the metallic mold 18 as discussed after. In this regard, the lower end section of the hood lock stay 15 has forward extending flanges 25 located respectively at the right-side and left-side thereof in order to prevent a rigidity lowering due to change in cross-sectional shape. The forward extending flanges 25 are located at the right-side and left-side of the inclined bottom wall 15a and extends forward or in the direction in which the side walls 15b, 15c of the hood lock stay 15 extend.

The hood lock installation section 16 formed of metal is welded to the laterally central part of the radiator core support upper section 13 corresponding to the upper end section of the hood lock stay 15, and therefore the rigidity of the food lock installation section 16 becomes high. Accordingly, a force for engaging a food lock mechanism (not shown) attached to the hood lock installation section 16 to a striker (not shown) of an engine hood is raised thereby effectively preventing the engine hood from fluttering during a vehicle running.

Additionally, the hood lock installation section 16 is formed at its lower end part with a bent portion 26 which extends perpendicular and rearward from and the main body portion (not identified) of the hood lock installation section 16. The bent portion 26 is embedded in the upper end section of the hood lock stay 15 formed of synthetic resin. Accordingly, a downward load applied to the hood lock installation section 16 can be securely transmitted to the hood lock stay 15 when the engine hood is closed.

The radiator core support upper section 13 and the radiator core support lower section 14 are provided in their channel C with the inclined ribs 21, 22. Additionally, four resin covering or wrapping sections 27 are formed on the radiator core support upper section 13, and five resin covering or wrapping sections 28, 29 are formed on the radiator core support lower section 14, as shown in FIGS. 3, 8, 9 and 10. Each resin covering section 27, 28, 29 is formed by allowing synthetic resin to flow from the back-side (the inside of the channel C) of the wall of the radiator support upper or lower section 13, 14 to the front-side of the wall, so that the resin covering section 27, 28, 29 is contiguous with the inclined ribs 21, 22 located inside the channel C of the radiator support upper or lower section 13, 14. Thus, the resin covering section 27, 28, 29 is formed band-shaped and surrounds the outer surface (the outer surfaces of the upper, lower and bottom walls W1, W2, W3) of the radiator support upper or lower section 13, 14.

Figure 8:
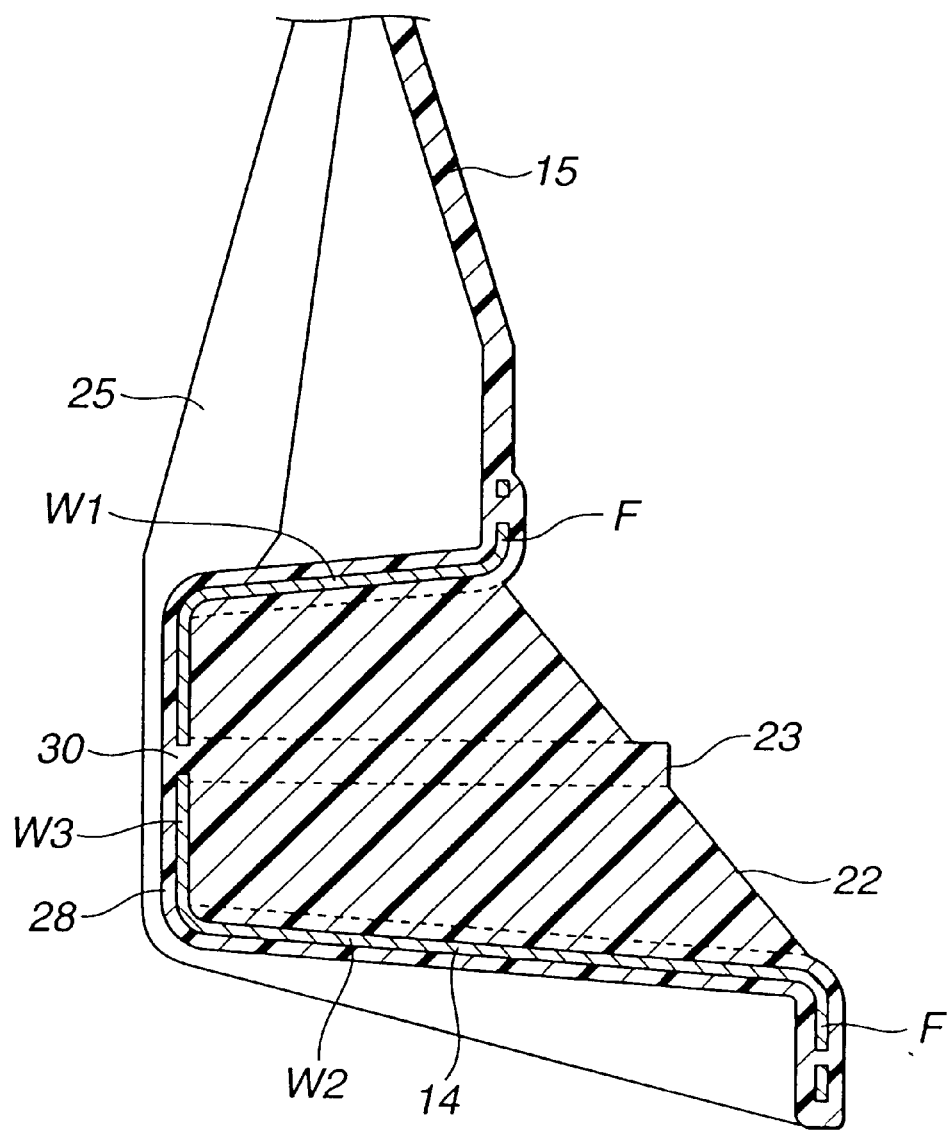
FIG. 8 is a fragmentary sectional view of the radiator core support lower section, taken in the direction of arrows substantially along the line VIII—VIII of FIG. 5.
Figure 9:
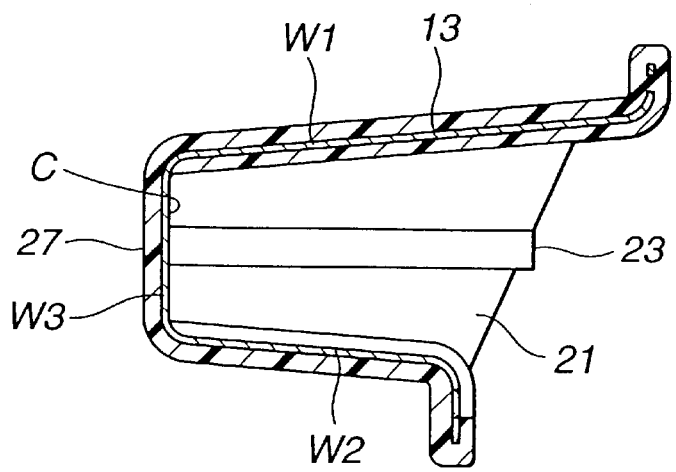
FIG. 9 is a cross-sectional view of a radiator core support upper section, taken in the direction of arrows substantially along the line IV—IV of FIG. 3.
Figure 10:
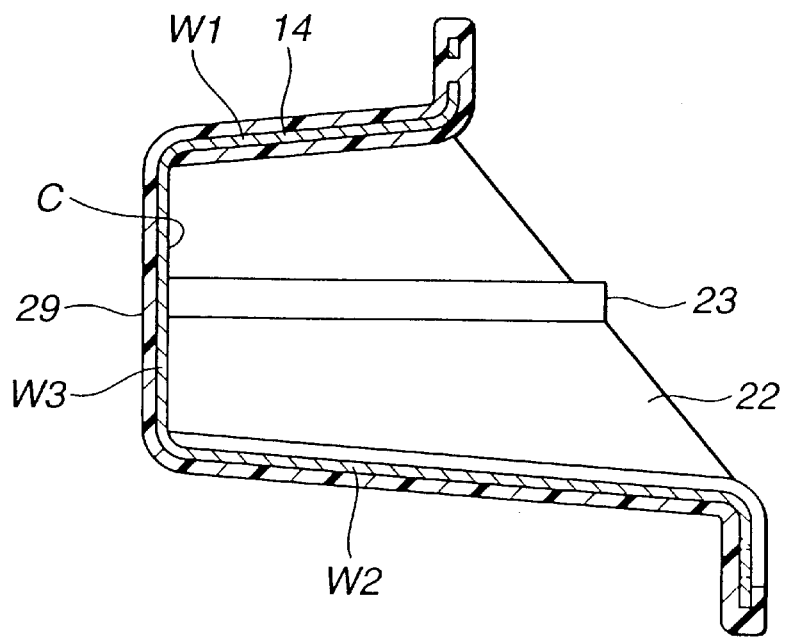
FIG. 10 is a cross-sectional view of the radiator core support lower section, taken in the direction of arrows substantially along the line X—X of FIG. 3.

Since the resin covering section 27, 28, 29 located outside the channel C is formed contiguous with the inclined ribs 21, 22 located inside the channel C, the parts formed of metal and the parts formed of synthetic resin can be securely united. As shown in FIG. 8, the flange sections F (extended from the upper and lower walls W1, W2, W3) of the radiator core support upper and lower sections 13, 14 are formed respectively with through-holes (not identified) through which synthetic resin flows. By this, the parts formed of metal and the parts formed of synthetic resin are further securely united. Furthermore, in order to further securely uniting the parts formed of metal and the parts formed of synthetic resin, the flange sections F may be formed at their end edge portions with a semicircular cutout (not shown) or the like; or the end edge portion of the flange sections F may be bent to have an angle relative to the surface of the main body of the flange section F.

Figure 11:
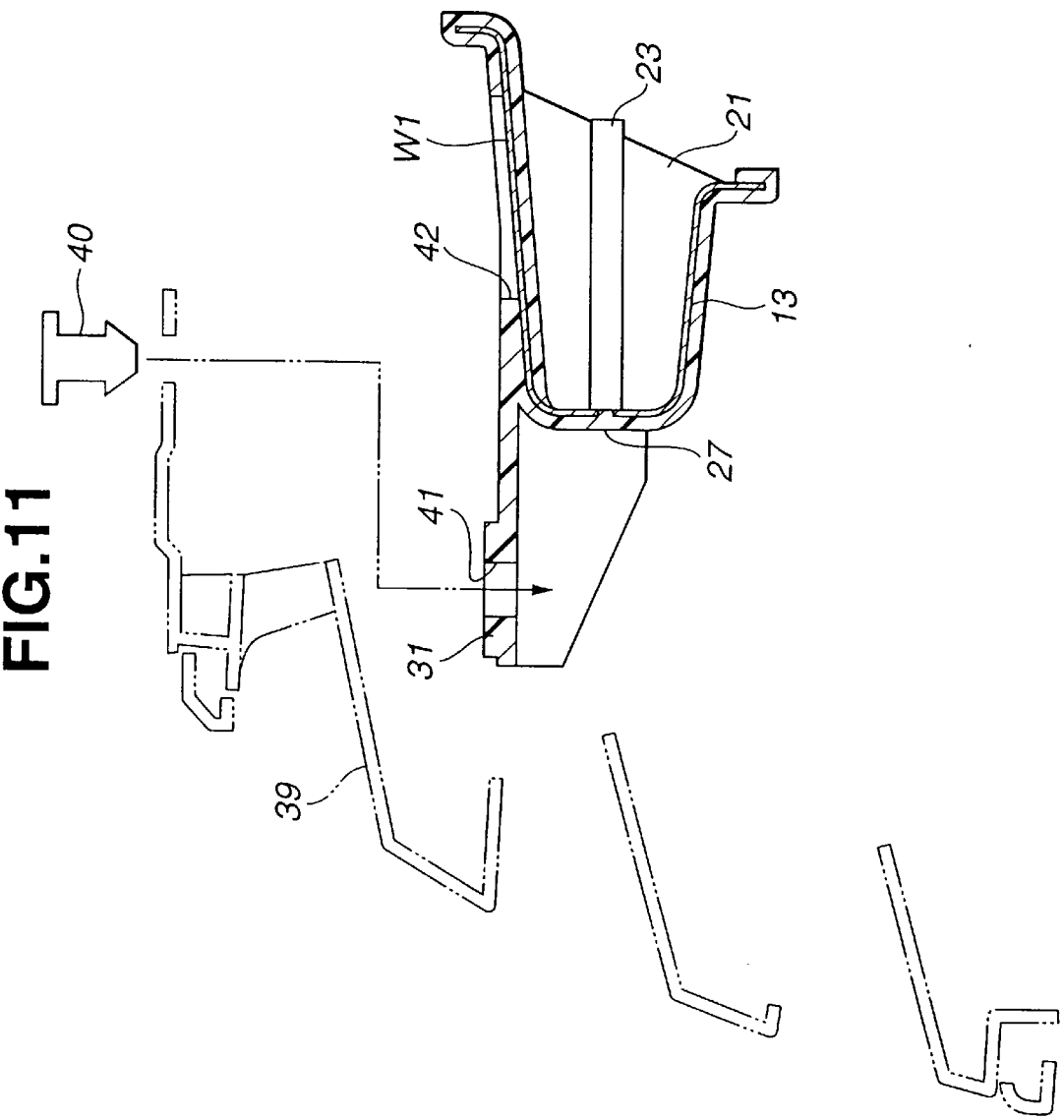
FIG. 11 is an enlarged cross-sectional view of a support piece for a front grille, formed on the radiator core upper section.

Since the inclined ribs 21, 22 are formed extending from the hood lock stay 15 to the inside of the channel C of the radiator core support upper and lower sections 13, the above-mentioned resin covering sections 27, 28, 29 are formed to be integral with the inclined ribs 21, 22 while brackets or the like may be formed integral with the parts formed of synthetic resin at necessary portions. For example, the brackets or the like include support pieces 31 which are formed in a state to project from the four resin covering sections 27 in order that a front grille 39 is attached to the support pieces 31, as shown in FIGS. 3 and 11. Each support piece 31 is formed at its tip end section with an opening 41 into which a clip 40 for installation of the front grille 39 is fitted. The support piece 31 is further formed with an elongate opening 42 through which the surface of the upper wall W1 of the radiator core support upper section 13 is exposed in the rectangular shape.

As shown in FIG. 3, an additional support piece 32 for elastically supporting the power steering system oil cooler tube 6 is formed projecting from the inclined ribs 21, 22 corresponding to the right-side resin covering section 29 formed on the radiator core support lower section 14. A further support piece 33 is formed at the left side of the support piece 32. A still further support piece 34 is formed at the right side of the support piece 32 and extending from the pillar section 19.

As shown in FIG. 8, each of anchor sections 30 is formed through a through-hole formed at the bottom wall W3 of the radiator core support upper and lower sections 13, 14 in order to integrally connect the inclined ribs 21, 22 located inside the channel C and the resin covering section 27, 28, 29 located outside the channel C of the radiator core support upper and lower sections 13, 14. In other words, the resin covering section 27, 28, 29 is in a state to pierce the wall of the radiator core support upper and lower sections 13, 14, so as to be improved in installation rigidity to the radiator core support upper and lower sections 13, 14. Each anchor section 30 corresponds to or is directly integrally connected to the column-like struck portion 23 formed at the central part of the inclined rib 21, 22, the support piece 32 for the power steering system oil cooler tube, and the support piece 31 for the front grille, thereby improving the rigidity of the column-like struck portion 23 and the support pieces 31, 32.

Next, a process for producing the radiator core support structure 1 of the above configuration using the metallic mold 18 will be discussed with reference to FIGS. 12 to 17 and FIGS. 18 and 19. FIGS. 12 to 17 schematically illustrate the fragmentary sectional views of a part of the metallic mold 18 generally corresponding to the support piece 31 for the front grille 39. FIG. 8 illustrates the fragmentary enlarged sectional view of a part of the metallic mold 18 generally corresponding to the resin-covering section 29 of the radiator core support lower section 14.

Figure 12:
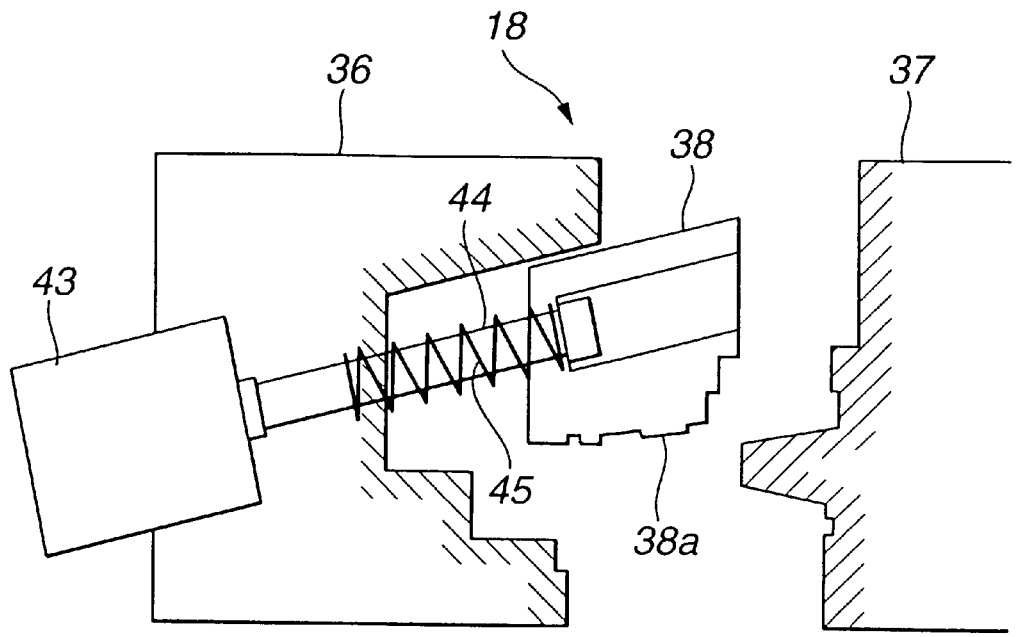
FIG. 12 is a schematic sectional view of a part of a metallic mold in a state where the metallic mold is opened.

As shown in FIG. 12, the metallic mold includes the stationary mold 36. The movable mold 37 is provided to be horizontally moved relative to the stationary mold 36. A slide mold 38 is provided to be slidably movable in a direction crossing a direction in which the movable mold 37 moves. The slide mold 36 is installed to a cylinder 44 of a hydraulic coupling device 43, and movable relative to the cylinder 44. The slide mold 36 is biased in a direction far from the stationary mold 36 by a spring 45. A cavity space for forming the hood lock stay 15 and the like is formed among the stationary mold 36, the movable mold 37 and the slide mold 38. The slide mold 38 has a projection 38a corresponding to the elongate opening 42 through which the surface of the upper wall W1 of the radiator core support upper section 13 is exposed.

Figure 13:
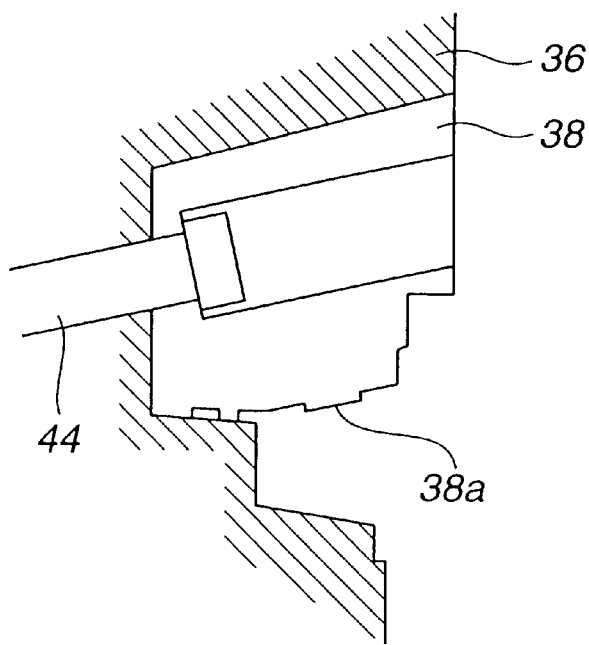
FIG. 13 is a fragmentary schematic sectional view of the part of the metallic mold in a state where a slide mold is fitted in a stationary mold of the metallic mold.
Figure 14:
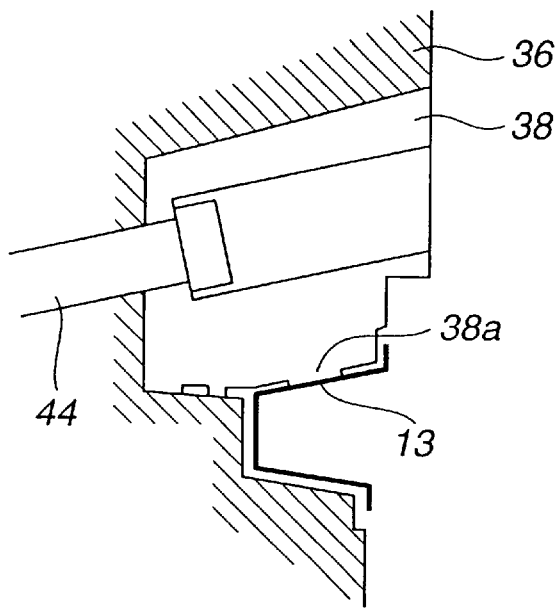
FIG. 14 is a fragmentary schematic sectional view of the part of the metallic mold in a state where a radiator core upper section and the like are set in position.

First, the cylinder 44 of the hydraulic coupling device 43 is moved backward so that the slide mold 38 is fitted into the stationary mold 38, as shown in FIG. 13. Subsequently, the radiator core support upper section 13 and the like as the metal parts of the radiator core support structure 1 are set in the cavity of the stationary mold 36, as shown in FIG. 14. At this time, for the purpose of locating the radiator core support upper section 13 relative to the stationary mold 36, it may be accomplished to insert locating pins (not shown) projected from the stationary mold 36 into locating holes (not shown) formed in the radiator core support upper section 13. In addition to or independent from the above locating pins, the side of the stationary mold 36 is provided with a magnet (not shown) which attracts and supports the radiator core upper section 13 at a certain position of the stationary mold 36. The magnet may be disposed to be movable and projectable over the surface of the stationary mold 36 under the action of a spring.

Figure 15:
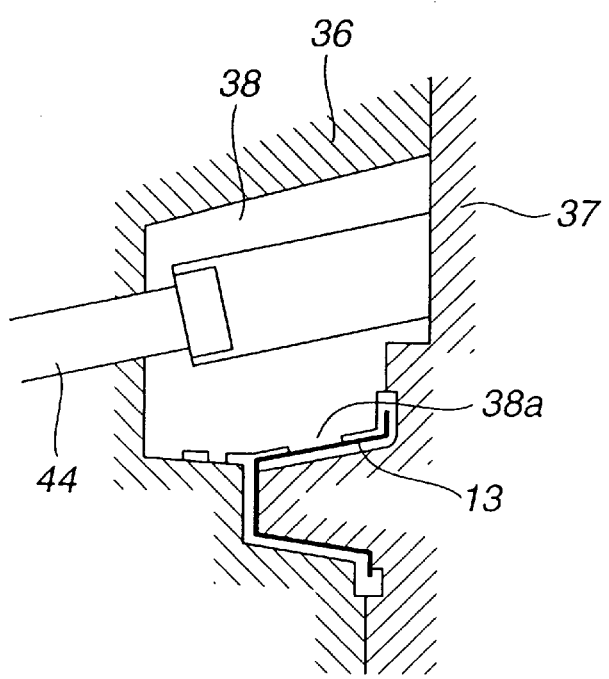
FIG. 15 is a fragmentary schematic sectional view of the part of the metallic mold in a state where the metallic mold is closed.
Figure 16:
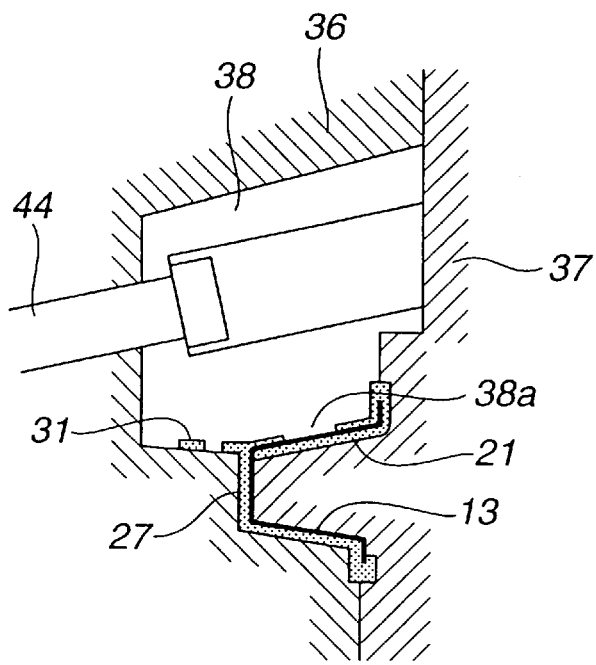
FIG. 16 is a fragmentary schematic sectional view of the part of the metallic mold in a state where synthetic resin is injected into a cavity space of the metallic mold.

Then, the movable mold 37 is brought into contact or fit with the stationary mold 37 and the slide mold 38, as shown in FIG. 15. After the movable mold 37 has been contacted with the stationary mold 37 and the slide mold 38, synthetic resin is injected into the cavity space of the metallic mold 18, as shown in FIG. 16. At this time, the upper surface of the radiator core support upper section 13 is pressed by the projection 38a of the slide mold 38, and consequently the upper surface portion of the radiator core support upper section 13 is prevented from deforming owing to the pressure of synthetic resin during injection molding. In other words, it will be assumed that the part having the support piece 31 is of the resin covering section 27, so that the part does not contact with any section and therefore is unstable and in a free state. However, in this embodiment, the projection 38a corresponding the elongate opening 42 is brought into contact with the part having the support piece 31, and therefore the upper surface portion of the radiator core support upper section 13 is prevented from being deformed under the pressure of injected synthetic resin.

Figure 17:
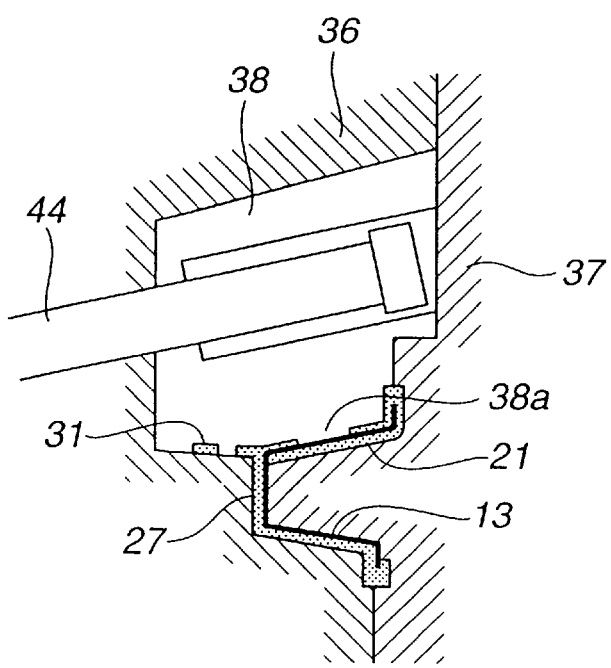
FIG. 17 is a fragmentary schematic sectional view of the part of the metallic mold in a state where a cylinder of a hydraulic coupling device is moved forward, succeeding to the state of FIG. 16.

After the synthetic resin is injected into the cavity space of the metallic mold 18, the cylinder 44 of the hydraulic coupling device 43 is moved forward, as shown in FIG. 17. Then, when the metallic mold 18 is opened by moving the movable mold 37 in the direction far from the stationary mold 36, the slide mold 38 is simultaneously moved in the direction far from the stationary mold 36 under the action of the spring 45, so that the metallic mold 18 is returned to its state shown in FIG. 12.

Figure 18:
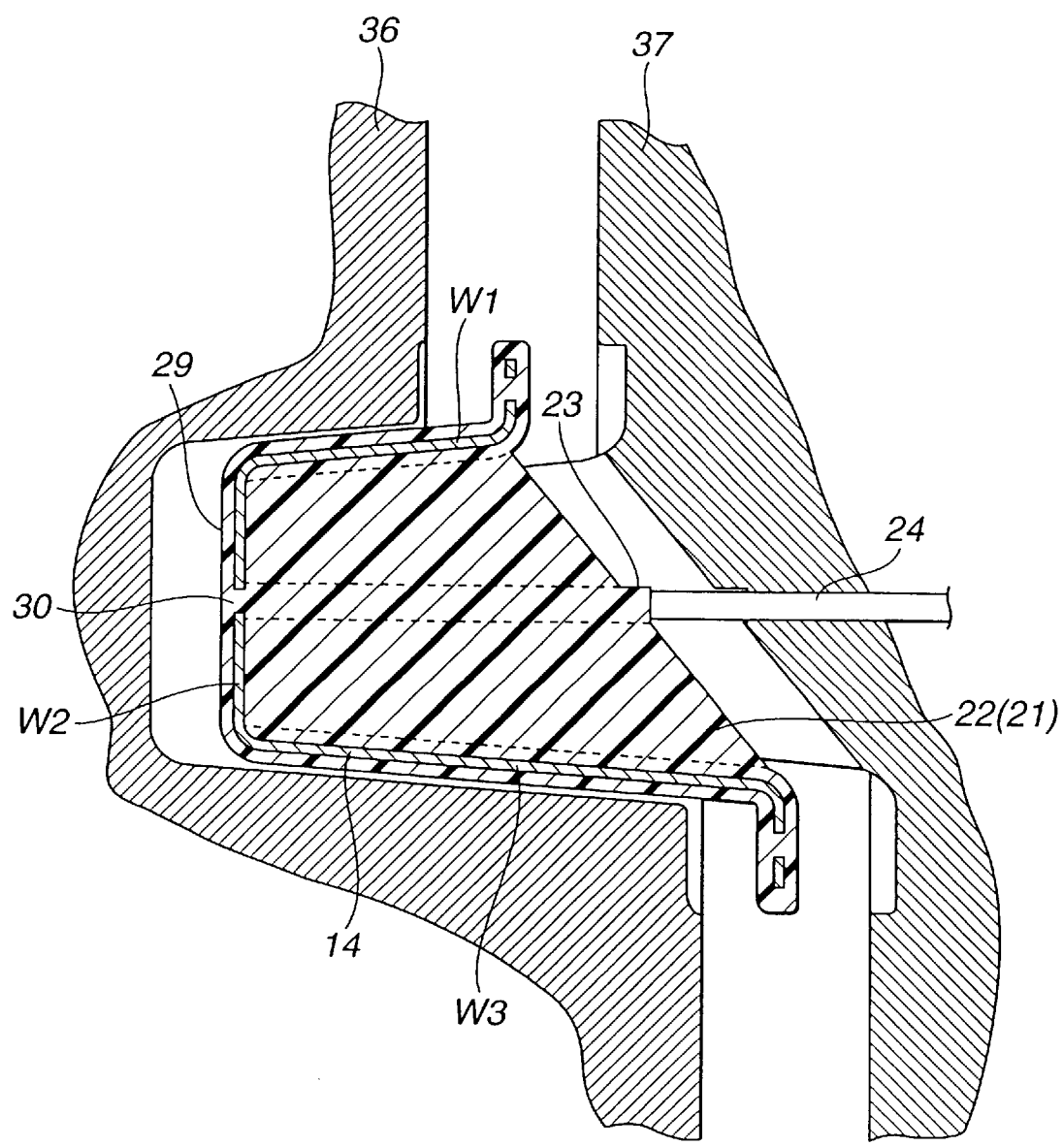
FIG. 18 is a fragmentary sectional view showing a state where a struck portion of an inclined rib is pushed by an ejector pin during opening of the metallic mold.

FIG. 18 shows a state where the inclined ribs 21, 22 of the radiator core support lower section 14 are drawn out from the metallic mold 18. It will be understood that the inclined ribs 21, 22 of the radiator core support upper section 13 takes the similar state, and therefore illustration thereof is omitted for the purpose of simplicity of illustration. As viewed in FIG. 18, the struck portion 23 of the radiator core support lower section 14 and the radiator core support upper 13 is located at the central part of each inclined rib 21, 22 and extends generally in the fore-and-aft direction of the vehicle. The struck portion 23 has the column-like shape and has a cross-sectional area which is larger than the thickness of each inclined rib 21, 22. More specifically, the cross-sectional area of the struck portion 23 is larger than the cross-sectional area (defined by the thickness and the dimension corresponding to the diameter of the struck portion) of each inclined rib 21, 22. The struck portion 23 has a flat rear end face. This struck portion 23 is struck or pushed by an ejector pin 24 in order to extract the injection-molded inclined ribs 21, 22 from the metallic mold 18. By thus pushing the struck portion 23 formed at the central part of each inclined rib 21, 22, even the inclined ribs 21, 22 which tend to readily breakable during its extraction from the metallic mold 18 can be smoothly extracted from the metallic mold 18 preventing their breakage from occurrence.

More specifically, if the rear end portions of the upper and lower walls W1, W2 of the radiator core support lower section 14 and the like are pushed by the ejector pins 24, there is a fear that the upper and lower walls W1, W2 will be deformed in directions far from each other so that the upper and lower end portions of each inclined rib 21, 22 are damaged. Additionally, even if the bottom wall (formed of metal) W3 is directly pushed by the ejector pin 24, there is a fear that the bottom wall W3 will be deformed. However, in the above embodiment, the inclined rib 21, 22 is directly pushed through the struck portion 23 by the ejector pin 24, and therefore the inclined ribs 21, 22 can be prevented from being damaged in a state to be left in the metallic mold 18 during extraction of the inclined ribs 21, 22 from the metallic mold 18.

As discussed above, the parts formed of synthetic resin are formed to be securely united with the parts formed of metal by injecting synthetic resin into the metallic mold 18, thereby producing the radiator core support structure 1. The radiator 8 and the like are assembled with the thus produced radiator core support structure 1 so as to be modularized. After such modularization, the side sections 17 (formed of metal) welded respectively to the opposite end sections of the radiator core support lower section 14 are installed respectively to the front end sections of the front side members 10 while the opposite end sections of the radiator core support upper section 13 are installed respectively to the front end sections (not shown) of the hood ridge panels 11.

The hood lock stay 15 for connecting the radiator core support upper and lower sections 13, 14 is molded in the metallic mold 18 to be rigidly combined or united with the radiator core support upper and lower sections 13, 14 which are also put in the metallic mold 18. This hood lock stay 15 formed of synthetic resin removes causes for producing the torsional deformation and the assembly-dimensional error of the radiator core support structure 1, thus facilitating the above-discussed installation operation of the radiator support structure 1 to the vehicle body front structure 2. Particularly, since the resin covering or wrapping section 28 is formed at the lower end section of the hood lock stay 15, the rigidity of the connection of the hood lock stay 15 with the radiator core support lower section 14 can be improved so as to be endurable to a downward impact to be applied to the radiator core support lower section 14 from the hood lock stay 15 even though the hood lock stay 15 is formed of synthetic resin.

Additionally, since the side sections 17 installed to the front side members 10 are formed of metal, the radiator core support structure 1 can be rigidly connected to the front side members 10 of the vehicle body. Further, the radiator core support upper section 13 and the radiator core support lower section 14 are formed of metal, and therefore the rigidity of the whole radiator core support structure 1 can become high thereby improving the noise and vibration characteristics and the driveability of the vehicle.

Figure 19:
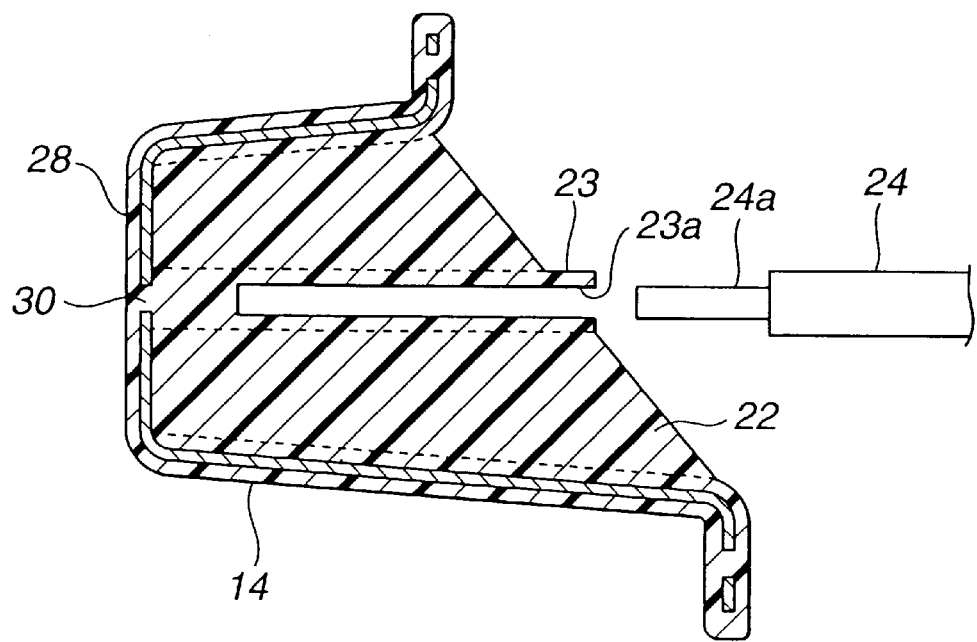
FIG. 19 is a fragmentary sectional view similar to FIG. 18, of an essential part of another embodiment of the radiator core support structure according to the present invention, showing the relationship between a struck portion of an inclined rib and an ejector pin.

FIG. 19 illustrates an essential part of another embodiment of the radiator core support structure 1 according to the present invention, similar to the embodiment shown in FIGS. 1 to 18. In this embodiment, each column-like struck portion 23 is formed at its rear end face with a depression or hollow 23a which is generally coaxial with the struck portion 23 and extends along the axis of the struck portion 23 to reach a position near the bottom wall W3 of the radiator core support lower section 14 having the generally C-shaped cross-section, the position being slightly separate from the bottom wall W3. The ejector pin 24 is provided at its tip end portion with a cylindrical projection 24a which is coaxial with and extends along the axis of the ejector pin 24. The cylindrical projection 24a is smaller in diameter than the ejector pin 24 and insertable into the hollow 23a of the struck portion 23. The projection 24a is smaller in axial length than the hollow 23a of the struck portion 23, so that it is sufficient that the projection 24a is insertable to the inlet part of the hollow 23a.

According to this embodiment, since the projection 24a of the ejector pin 24 is insertable into the hollow 23a of the struck portion 23, a locational shift of the inclined ribs 21, 22 can be prevented when the struck portion 23 is pushed by the ejector pin 24 while saving a raw material and lightening the weight of the radiator core support structure 1 by amounts corresponding to the hollow 23a formed in the struck portion 23.

While the inclined ribs 21, 22 have been shown and described as the reinforcement ribs, it will be understood that the reinforcement ribs formed inside the channel C of the radiator core support upper and lower sections 13, 14 are not limited to the inclined ribs 21, 22, so that each of the reinforcement ribs may be formed extending perpendicular to the longitudinal direction of the radiator core upper and lower sections 13, 14. Additionally, although the struck portion 23 has been shown and described as being formed as having the generally column-like shape, it will be appreciated that the struck portion 23 may have a rectangular cross-section. Further, two struck portions 23 may be formed on each reinforcement rib. Furthermore, it will be appreciated that the present invention does not exclude that the ejector pin 24 pushes the other portions than the struck portion 23, so that the ejector pin 24 may push not only the struck portion 23 but also the other portions of each reinforcement rib.

What is claimed is:

1. A radiator core support structure for a vehicle, comprising:

a radiator core support upper section extending generally along a direction of width of the vehicle;

a radiator core support lower section extending generally along the direction of width of the vehicle and located below said radiator core support upper section, wherein at least one of said radiator core support upper section and said radiator core support lower section is formed of metal and has an open loop-shaped cross-section which is opened rearward to form a channel extending in a longitudinal direction of the at least one of said radiator core support upper section and said radiator core support lower section, the at least one of said radiator core support upper section and said radiator core support lower section having an upper wall and a lower wall;

a hood lock stay extending generally vertical, for connecting a generally central part of said radiator core support upper section and a generally central part of said radiator core support lower section, the generally central part being in the direction of width of the vehicle, said hood lock stay being formed of synthetic resin and molded in a metallic mold in which the at least one of said radiator core support upper section and said radiator core support lower section is located;

a plurality of reinforcement ribs formed of the synthetic resin and fixedly disposed inside the channel of the at least one of said radiator core support upper section and said radiator core support lower section, said reinforcement ribs continuously extending in a longitudinal direction of the at least one of said radiator core support upper section and said radiator core support lower section, each reinforcement rib extending to fixedly connect the upper wall and the lower wall of the at least one of said radiator core support upper section and said radiator core support lower section; and a struck portion integrally formed at a part of each reinforcement rib and to be struck by an ejector pin for extracting said radiator core support structure from the metallic mold.

2. A radiator core support structure as claimed in claim 1, wherein said struck portion is formed generally at a central portion of each reinforcement rib, a part of said struck portion being located generally at a longitudinal center of an edge of each reinforcement rib.

3. A radiator core support structure as claimed in claim 1, wherein said struck portion is in a column-like shape and extends to reach a bottom wall of at least one of said radiator core support upper section and said radiator core support lower section, the bottom wall being located to connect the upper wall and the lower wall, said struck portion having a cross-sectional area larger than a thickness of each reinforcement rib.

4. A radiator core support structure as claimed in claim 3, wherein said struck portion is formed with a hollow having a diameter smaller than that of said struck portion, the hollow extending in an axial direction of said struck portion and having an axial length, wherein the ejector pin has a projection which is projected from a tip end of the ejector pin and has a diameter smaller than that of the ejector pin to be insertable into the hollow of said struck portion.

5. A radiator core support structure as claimed in claim 1, wherein further comprising a covering section formed of the synthetic resin and contiguous through an anchor section with a part of said reinforcement ribs, said covering section covering an outer surface of the at least one of said radiator core support upper section and said radiator core support lower section and extending from an outer surface of an upper wall to the outer surface of the lower wall of the at least one of said radiator core support upper section and said radiator core support lower section, said anchor section being located corresponding to said struck portion and piercing a wall of the at least one of said radiator core support structure upper section and said radiator core support structure lower section.

6. A radiator core support structure as claimed in claim 1, wherein said reinforcement ribs are inclined ribs which are inclined relative to a vertical plane perpendicular to the upper wall and the lower wall, said reinforcement ribs being disposed between the upper wall and the lower wall of the at least one of said radiator core support upper section and said radiator core support lower section and continuously extending in a zigzag pattern generally along the direction of width of the vehicle.

7. A radiator core support structure as claimed in claim 6, wherein each of said inclined ribs has an angle ranging from 30° to 60° relative to a longitudinal direction of the at least one of said radiator core support upper section and said radiator core support lower section.

8. A radiator core support structure as claimed in claim 1, wherein said radiator core support upper section is formed of metal, wherein said radiator core support structure further comprises a hood lock installation section which is formed of metal and formed at a laterally central part of said radiator core support upper section.

9. A radiator core support structure as claimed in claim 8, wherein a bent portion is formed at a lower end part of said hood lock installation section and embedded in an upper end section of said hood lock stay formed of synthetic resin.

10. A radiator core support structure as claimed in claim 1, wherein said radiator core support lower section is formed of metal, wherein said radiator core support structure further comprises side sections formed of metal, said side sections being formed at opposite end sections of said radiator core support lower section, said side sections being respectively to be connected to front side members of a vehicle body.

11. A radiator core support structure as claimed in claim 10, further comprising pillar sections each of which is located inboard of each side section and disposed to rigidly connect an inboard side edge of each side section, said radiator core support upper section and said radiator core support lower section, said pillar sections being formed integrally contiguous with said reinforcement ribs.

12. A radiator core support structure as claimed in claim 10, further comprising lamp installation sections which are disposed at opposite end sections of said radiator core support upper section, each lamp installation section being disposed to rigidly connect one of the opposite end sections of said radiator core support upper section and said side section, said lamp installation sections being formed integrally contiguous with said reinforcement ribs.

13. A radiator core support structure for a vehicle, comprising:

a radiator core support upper section extending generally along a direction of width of the vehicle;

a radiator core support lower section extending generally along the direction of width of the vehicle and located below said radiator core support upper section, wherein at least one of said radiator core support upper section and said radiator core support lower section is formed of metal and has an open loop-shaped cross-section which is opened rearward to form a channel extending in a longitudinal direction of the at least one of said radiator core support upper section and said radiator core support lower section, the at least one of said radiator core support upper section and said radiator core support lower section having an upper wall and a lower wall;

a hood lock stay extending generally vertical, for connecting a generally central part of said radiator core support upper section and a generally central part of said radiator core support lower section, the generally central part being in the direction of width of the vehicle, said hood lock stay being formed of synthetic resin and molded in a metallic mold in which the at least one of said radiator core support upper section and said radiator core support lower section is located;

a reinforcement section formed of synthetic resin and fixedly disposed inside the channel of the at least one of said radiator core support upper section and said radiator core support lower section, said reinforcement section continuously extending in a longitudinal direction of the at least one of said radiator core support upper section and said radiator core support lower section; and a covering section formed of the synthetic resin and contiguous with said reinforcement section, said covering section covering an outer surface of the at least one of said radiator core support upper section and said radiator core support lower section and extending from an outer surface of an upper wall to the outer surface of the lower wall of the at least one of said radiator core support upper section and said radiator core support lower section, said covering section being formed with at least one opening located corresponding to at least one of the upper wall and the lower wall, a surface of the at least one of the upper wall and the lower wall being exposed through the at least one opening.

14. A radiator core support structure as claimed in claim 13, further comprising a support piece for installation of a front grille, said support piece being integral with and projected forward from said covering section.

15. A radiator core support structure as claimed in claim 13, wherein said covering section is contiguous through an anchor section with said reinforcement section, said anchor section being located corresponding to said covering section of the at least one of said radiator core support upper section and said radiator core support lower section and piercing a wall of the at least one of said radiator core support upper section and said radiator core support lower section.

16. A radiator core support structure as claimed in claim 13, wherein said reinforcement section includes inclined ribs which are inclined relative to a vertical plane perpendicular to the upper wall and the lower wall, said inclined ribs being disposed between the upper wall and the lower wall of the at least one of said radiator core support upper section and said radiator core support lower section and continuously extending in a zigzag pattern generally along the direction of width of the vehicle.

17. A radiator core support structure as claimed in claim 16, further comprising a struck portion integrally formed at a part of each of said inclined ribs and to be struck by an ejector pin for extracting said radiator core support structure from the metallic mold.

18. A radiator core support structure as claimed in claim 13, wherein said radiator core support upper section is formed of metal, wherein said radiator core support structure further comprises a hood lock installation section which is formed of metal and formed at a laterally central part of said radiator core support upper section.

19. A radiator core support structure as claimed in claim 18, wherein a bent portion is formed at a lower end part of said hood lock installation section and embedded in an upper end section of said hood lock stay formed of synthetic resin.

20. A radiator core support structure as claimed in claim 13, wherein said radiator core support lower section is formed of metal, wherein said radiator core support structure further comprises side sections formed of metal, said side sections being formed at opposite end sections of said radiator core support lower section, said side sections being respectively to be connected to front side members of a vehicle body.

21. A radiator core support structure as claimed in claim 20, further comprising pillar sections each of which is located inboard of each side section and disposed to rigidly connect an inboard side edge of each side section, said radiator core support upper section and said radiator core support lower section, said pillar sections being formed integrally contiguous with said reinforcement section.

22. A radiator core support structure as claimed in claim 20, further comprising lamp installation sections which are disposed at opposite end sections of said radiator core support upper section, each lamp installation section being disposed to rigidly connect one of the opposite end sections of said radiator core support upper section and said side section, said lamp installation sections being formed integrally contiguous with said reinforcement section.

23. A radiator core support structure for a vehicle, comprising:

a radiator core support upper section extending generally along a direction of width of the vehicle;

a radiator core support lower section extending generally along the direction of width of the vehicle and located below said radiator core support upper section, wherein at least one of said radiator core support upper section and said radiator core support lower section is formed of metal and has an open loop-shaped cross-section which is opened rearward to form a channel extending in a longitudinal direction of the at least one of said radiator core support upper section and said radiator core support lower section, the at least one of said radiator core support upper section and said radiator core support lower section having an upper wall, a lower wall, and a bottom wall connecting the upper and lower walls;

a hood lock stay extending generally vertical, for connecting a generally central part of said radiator core support upper section and a generally central part of said radiator core support lower section, the generally central part being in the direction of width of the vehicle, said hood lock stay being formed of synthetic resin and molded in a metallic mold in which the at least one of said radiator core support upper section and said radiator core support lower section is located;

a plurality of reinforcement ribs formed of the synthetic resin and fixedly disposed inside the channel of the at least one of said radiator core support upper section and said radiator core support lower section, said reinforcement ribs continuously extending in a longitudinal direction of the at least one of said radiator core support upper section and said radiator core support lower section, each reinforcement rib extending to fixedly connect the upper wall and the lower wall of the at least one of said radiator core support upper section and said radiator core support lower section; and a struck portion integrally formed at a part of each reinforcement rib and to be struck by an ejector pin for extracting said radiator core support structure from the metallic mold, said struck portion is generally column like and extending to the bottom wall of the at least one of said radiator core support upper section and said radiator core support lower section, said struck portion having a diameter larger than a thickness of each reinforcement rib.

* * * * *